July 20, 1965

M. S. DIETZ 3,195,434

PHOTOGRAPHIC FILM ASSEMBLY MOUNT

Filed Dec. 28, 1962

INVENTOR.
Milton S. Dietz
BY
Brown and Mikulka
ATTORNEYS

United States Patent Office 3,195,434
Patented July 20, 1965

3,195,434
PHOTOGRAPHIC FILM ASSEMBLY MOUNT
Milton S. Dietz, Lexington, Mass., assignor to Polaroid Corporation, Cambridge, Mass., a corporation of Delaware
Filed Dec. 28, 1962, Ser. No. 247,958
8 Claims. (Cl. 95—66)

This invention relates to a novel mount for a photographic film assembly. The mount is particularly intended for use with a film unit or assembly including a photosensitive film component of a miniature format which is exposed and processed in a self-developing type of camera.

The film mount of the present invention is of a structure which facilitates the photographic exposure and processing by a so-called diffusion transfer method of the aforesaid photosensitive film component mounted therein and makes possible the immediate projection of a finished transparency produced within the film component. When the entire film assembly is withdrawn from the camera, namely, an assembly comprising the mount, an exhausted container of a processing liquid, the photosensitive film component, a cover sheet, and a leader, if a leader is included as part of the assembly, and, whereafter, certain parts are manually stripped away, a completely mounted transparency is available. The transparency is thus in a condition suitable for immediate use in a conventional slide viewer or projector.

The present invention is principally concerned with the structure of the mount per se. A comprehensive type of film unit including the mount, a film container for supplying a plurality of the film units, and a miniature camera suitable for use therewith have been described, respectively, in detail in the copending U.S. applications, Serial Nos. 248,092, 248,093 and 248,094, of even date.

In accordance with the foregoing considerations, a principal object of the present invention is to provide a substantially rigid mount having certain novel structural features which, in conjunction with other components of a complete film assembly, contribute most effectively to the exposure and processing in a self-developing camera of a photosensitive film component of the assembly. Another object is to provide a mount of the character decribed which makes possible the immediate use of a transparency which has been produced within the film assembly for direct viewing or projection purposes.

A further object is to provide a film mount, as described, which is suitable for use with a film component of a 35 mm. or other miniature format.

Still another object is to provide a film mount of the character described which can be accommodated by any standard slide viewer or slide projector.

Other objects of the invention will in part be obvious and will in part appear hereinafter.

The invention accordingly comprises the product possessing the features, properties and the relation of component which are exemplified in the following detailed disclosure, and the scope of the application of which will be indicated in the claims.

For a fuller understanding of the nature and objects of the invention, reference should be had to the following detailed description taken in connection with the accompanying drawing wherein.

Figure 5:
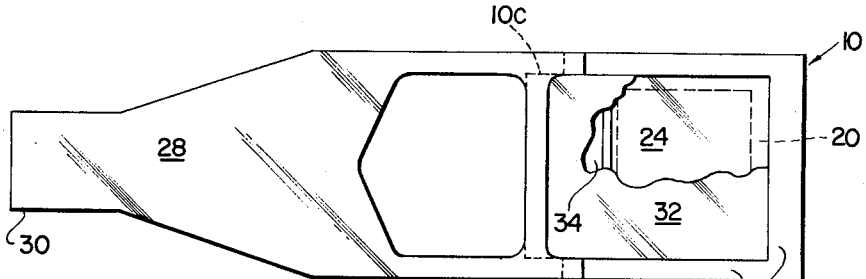
Figure 6:
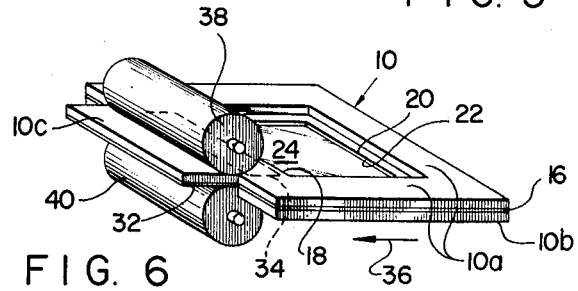

FIG. 5 is a diagrammatic rear view of a film unit comprising the film mount of the invention in assembled relation with other components. The entire assembly, as shown, is adapted to be used in a self-developing camera; and FIG. 6 is a diagrammatic, fragmentary, perspective view of an assembly comprising the film mount of the invention, an exposed photosensitive film component, a container of a processing liquid, and a cover sheet, approximately as the assembly would appear while passing between compressive processing means of a self-developing camera.

While the film mount of the present invention is, to a certain extent, illustrated and described herein in conjunction with other elements of a photographic film assembly for use in a self-developing camera, it is to be understood that these elements constitute no part of the invention and are included merely for explanatory purposes. Thus, for example, such components as a photosensitive film and cooperating means for effecting the exposure and processing of the film are included for the purpose of explaining most clearly the function of structural features of the mount itself.

Figure 1:
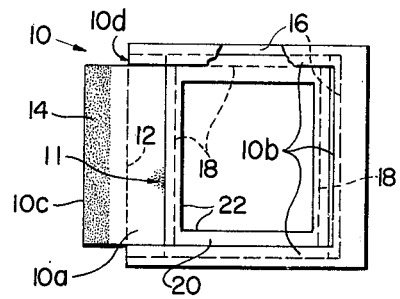
FIGURE 1 is a diagrammatic rear view of the mount of the invention.
Figure 2:
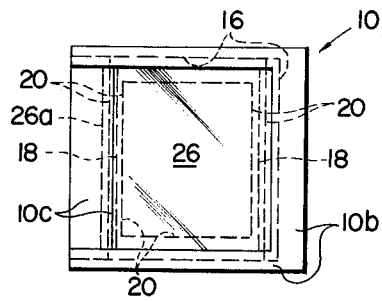
FIG. 2 is a diagrammatic side view of the mount, partly in cross-section and with parts broken away.
Figure 3:
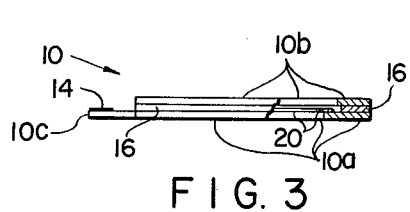
FIG. 3 is a diagrammatic rear view of the mount with a completed transparency mounted therin.

Referring now to FIGURE 1, the film assembly mount 10 is shown from the rear, that is, the side farthest from the front or objective lens location of a camera or projector in which it is to be positioned. In FIG. 2 it is shown from the side. The terms "front" and "rear" are used herein to denote proximity to or remoteness from the objective of the instrument in which the mount is located. The mount is a flat, substantially rigid, framelike structure composed, for example, of an essentially waterproof cardboard, a plastic or some other generally moisture-resistant material. It includes a front section 10a and a rear section 10b. The inner surface of each section is coated, at least in given areas and preferably throughout its area, with an adhesive 11, e.g., a heat-seal-ink adhesive such as a polyethylene, a small area, only, of said adhesive being illustrated. The front section 10a includes four unitary sides. An appendage or flap 10c, which is actually an extension of one side of the front section, projects from this side of the front section in the plane thereof and is scored or semi-perforated along a joining line 12 so that it can be bent inwardly 180° and brought into contact easily with the inner surface of the front section. The inner surface of the flap 10c has a coating, in the form of a transverse band 14, of a pressure-sensitive adhesive deposited thereon as, for example, a coating of a manually-separable, heat-resistant adhesive of the type of a very firm synthetic rubber resin adhesive. Such an adhesive means may advantagously be provided in the form of a tape, coated with the adhesive on both sides. The rear section 10b includes three unitary sides which are superimposed with three sides of the front section, exclusive of that side of the latter from which the flap 10c extends. The two sides of the rear section 10b which are opposite to one another are equal in width, both with respect to each other and to the two sides of the front section 10a with which they are superimposed. However, it will be noted that the third side of the rear section 10b is narrower than the corresponding side of the front section with which it is superimposed.

A spacer element 16, composed of a thin preferably water-resistant cardboard or the like, is positioned between the front and rear sections between the aforesaid superimposed sides of the sections, the two sections being bonded to opposite surfaces of the intermediate spacer by the aforementioned heat-sealing adhesive coated on their inner surfaces thus effecting an integral relation of the front and rear sections through the medium of the spacer. The two opposite superimposed and bonded sides of each section terminate at their ends along a line, which is an extension of the indention line 12, to form two short, firm surfaces 10ᵈ serviceable as contacting surfaces for limiting, in conjunction with cooperating mechanism of a camera, the movement of the mount and of associated components of the film assembly during their passage through the camera. While the preferred embodiment of the invention is the two-section structure shown herein, it is conceivable that both sections and a spacer therebetween could be composed of a plastic material cast or extruded as a single unit and, wherein such a structure would possess the specific features of the mount described herein, it is deemed to fall within the scope thereof.

The front section 10a has an aperture 18 formed therein. A thin, opaque, preferably resilient masking or framing element 20 having an aperture 22 formed therewithin is attached to the front section 10a. The frame-like element 20 is composed, for example, of an opaque sheet material such as a metallized plastic, or a metallic film. A plastic suitable therefor is polyethylene terephthalate sold by E. I. du Pont de Nemours, Wilmington, Delaware, U.S.A. under the trade name Mylar. The framing element 20 is bonded to the rear surface of front section 10a, along marginal areas surrounding aperture 18, by the aforesaid heat-sealing adhesive on the inner surface of the front section.

The aperture 22, formed by the frame-like element 20, defines the area of a photosensitive film material 24 which is to be (FIG. 5), or which has been (FIG. 6), photographically exposed. The rectangular aperture 22 may, for example, be considered as having the dimensions of the conventionally exposable area of a 24 x 35 mm. film, or it may have the dimensions of another film material customarily associated with a miniature camera. Although the long dimension of aperture 22 is shown, in a preferred embodiment, extending transversely of the mount, it is to be understood that said dimension could extend at 90° to that illustrated. Alternatively, the aperture could be of a square configuration.

FIG. 2 illustrates the mount of the present invention, again from the rear, with a film element 26 in the form of a completed transparency mounted therein. In this illustration it is to be assumed that photographic exposure and processing have been completed; that the mount and entire film assembly associated therewith have been withdrawn from the camera, and that elements employed in the processing operation have been stripped away. The flap 10c has been turned inwardly by the operator and pressed forwardly, the adhesive 14 causing it to adhere to the inner surface of the front section 10a and to serve as the fourth frame member of the rear section 10b. It is to be assumed that the transparency 26 is bonded by the aforesaid heat-sealing adhesive 11 to the front section 10a along a narrow, transversely-extending band adjacent to the edge 26a. Thus, FIG. 2 constitutes a completely mounted transparency as seen from the rear. It is in readiness to be used in a conventional slide viewer or projector.

Figure 4:
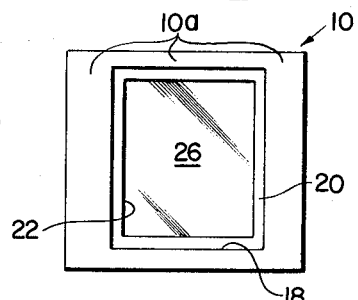
FIG. 4 is a diagrammatic front view of the mount and transparency.

In FIG. 4, the mount 10 is shown from the front. The transparency 26 is visible within the framing element 20 and the complete assembly is ready for projection or other contemplated use.

FIG. 5 illustrates the mount in conjunction with other elements, all shown from the rear, constituting a complete assembly which is adapted to be manually advanced in a self-developing camera to effect processing of the film component 24. The assembly comprises, in addition to the mount 10 and film component 24, a leader 28, a tab 30 at the end of the leader which is intended to protrude through an exit aperture of the camera where it can be grasped manually. Completing the assembly is a cover sheet 32 and a liquid container 34. The liquid container is preferably attached to the inner surface of the cover sheet and thus is positioned between the latter and the film component 24, the cover sheet serving as a barrier to aid in spreading the liquid over the film component 24.

FIG. 6 illustrates the assembly of mount 10 and accompanying elements shown in FIG. 5, without the leader 28. The assembly is undergoing progressive compression in the direction of the arrow 36 between the pressure rolls 38 and 40 such as would occur in a programming type of camera wherein mechanism of the camera performs substantially all of the processing operations. For reference purposes, the arrow 36 may also be taken as indicative of the direction of the longitudinal dimension of the mount. A direction at 90° thereto is to be considered as the direction of the transverse dimension of the mount. In the aforesaid programming category of camera, mechanism of the camera serves to advance the assembly rather than by manually drawing upon a leader and thus the leader becomes unnecessary and is omitted in FIG. 6. At the stage shown, the film component 24 has been exposed, the flap 10c and superimposed cover sheet 32 have passed between the pressure rolls 38 and 40, the container 34 is about to be subjected to compression and the processing liquid therein released and spread between the cover sheet 32 and the film component 24. It is to be noted that the extended flap 10c and the area, taken longitudinally, between it and the aperture 18 is, exclusive of the liquid container 34, of a constant and minimum thickness as it passes between the pressure rolls. The aforesaid structure, by avoiding parts of the rear section 10b in the path of the applied compression, insures that an undue thickness or marked changes in thickness between materials progressively brought between the pressure rolls, namely, the change in thickness between elements comprising the front section 10a superimposed with the cover sheet 32 and the same elements plus the liquid container 34, and between elements comprising the front section 10a, cover sheet 32 and liquid container 34 and elements comprising the superimposed framing element 20, film component 24 and cover sheet 32 are kept at a minimum. This obviates the need of opening the pressure rolls apart unduly and facilitates a more constant application of compressive force by the pressure rolls throughout the processing operation than would otherwise be possible thereby contributing to an even and consistent liquid spreading operation. The framing element 20 of the mount provides that the compressive force will be applied well beyond the actual image area defined by aperture 22 on all sides. This insures that the processing liquid will invariably be spread throughout at least the image area and constitutes a margin of safety with respect to complete coverage by the liquid. An attendant factor is the consistent provision of a sharply defined image, the edges of the resilient framing element 20 being sharp and adapted to hug the film component 24 during the application of compression.

Since certain changes may be made in the above product without departing from the scope of the invention herein involved, it is intended that all matter contained in the above description or shown in the accompanying drawing shall be interpreted as illustrative and not in a limiting sense.

What is claimed is:

1. A mount for use in exposing, processing and projecting a photographic film assembly of a type which includes a photosensitive film component and a contained processing liquid and which, in conjunction with compressive processing means, produces a finished transparency, said mount comprising a rectangular front section composed of four unitary frame-like, substantially rigid members forming a rectangular exposure aperture therebetween with an integral, inwardly pivotable flap extending laterally from one of said members, said flap having a width approximately equal to, but a length less than said one member, a pressure-sensitive adhesive affixed to a given inner-face area of said flap, a rear section composed of three unitary frame-like substantially rigid members superimposed with three of said members of the front section, exclusive of said one member from which said flap extends, and an intermediate spacer element composed of a relatively thin and narrow strip material positioned between said front and rear superimposed members providing a plurality of recesses therebetween for the reception of said photosensitive film component so as to position the latter across said exposure aperture, said superimposed members having their inner faces bonded to the opposite faces of said intermediate spacer element, said front and rear section members having an adhesive coated on their inner facing surfaces for effecting the bonding of their inner faces to said spacer element, said flap being adapted to be folded over inwardly after completion of said processing so as to overlie said one member of said front section from which it extends and, by reason of its length being less than that of said one member, to lie between and in the plane of the two laterally opposite members of said rear section and to be held at this position by said pressure-sensitive adhesive, said flap then constituting a fourth frame-like member of said rear section, the inner surface of said front section which lies between said superimposed members constituting a protective recess for positioning a container of said processing liquid which is frangible in response to an application of a compressive force, and for cooperating in additionally positioning a cover sheet for facilitating the spreading of said liquid, and said inner surface and the inner surface of said flap, taken together, providing both a continuous surface in a single plane for the reception of said compressive force as applied by said compressive processing means and a minimum thickness of said mount for introduction between said compressive processing means to enhance the proper release and even spreading of said processing liquid.

2. A mount for a photographic film assembly, as defined in claim 1, wherein said flap is rendered pivotable by means of at least one partial perforation formed in an outer face of said front section along a line joining said flap and said one member of said section.

3. A mount for a photographic film assembly, as defined in claim 1, wherein said pressure-sensitive adhesive is distributed transversely across said flap in the form of a narrow band of said adhesive.

4. A mount for a photographic film assembly, as defined in claim 1, wherein said front and rear section members are composed of a material substantially impervious to said processing liquid.

5. A mount for a photographic film assembly, as defined in claim 1, wherein said front section includes a thin, opaque, resilient sheet material bonded thereto and having a rectangular exposure aperture formed therein conforming generally, but on a smaller scale, to said front section aperture, said sheet material serving as a framing element and contributing, during an application of said compressive force, to a complete coverage and sharp outline of the image area of said film component by said processing liquid.

6. A mount for a photographic film assembly, as defined in claim 5, wherein the two opposite frame-like members of said rear section which are superimposed with said two opposite members of said front section are similar in width and length thereto, but wherein the width of the third member of said rear section is narrower than that of the front section member with which it is superimposed to further facilitate the application of said compressive force and a complete coverage of said processing liquid.

7. A mount for a photographic film assembly, as defined in claim 1, wherein said spacer element is composed of a material substantially impervious to said processing liquid.

8. A mount for a photographic film assembly, as defined in claim 1, wherein said liquid container is attached to an inner surface of said cover sheet.

References Cited by the Examiner
UNITED STATES PATENTS

| 788,607 | 5/05 | Sherman | 40—158 |
| 2,447,468 | 8/48 | Reyniers | 95—66 |
| 2,471,522 | 5/49 | Garrett | 95—66 |

NORTON ANSHER, *Primary Examiner.*

JOHN M. HORAN, *Examiner.*